UNITED STATES PATENT OFFICE.

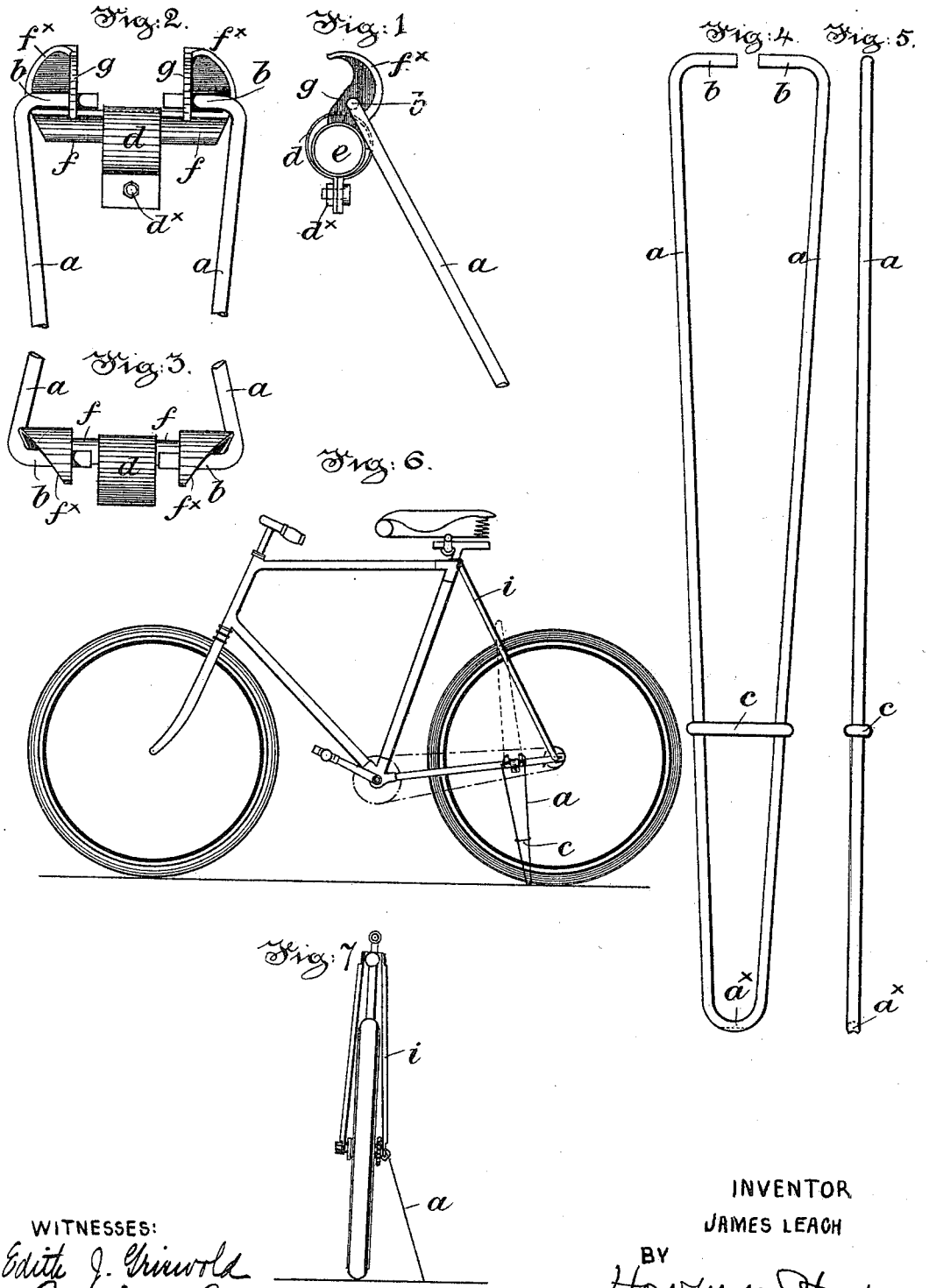

JAMES LEACH, OF CHORLEY, ENGLAND.

BICYCLE-SUPPORT.

SPECIFICATION forming part of Letters Patent No. 617,171, dated January 3, 1899.

Application filed August 9, 1898. Serial No. 688,191. (No model.)

*To all whom it may concern:*

Be it known that I, JAMES LEACH, a subject of the Queen of Great Britain, residing at Chorley, in the county of Lancaster, England, have invented a new and Improved Rest for Supporting a Bicycle in a Vertical Position, of which the following is a specification.

This invention consists, essentially, of an improved rest for supporting bicycles in a vertical position, and has for its principal object obviating the necessity for leaning a bicycle against a wall or other object or laying it down upon its side upon the floor or ground when not in use.

My invention will be readily understood on reference to the annexed sheet of drawings and the following explanation thereof.

Figure 1 on the drawings is an end view, Fig. 2 a back view, and Fig. 3 a plan view, of the bracket or fixed part of my invention. Figs. 4 and 5 are side and front views of the movable portion or stay. Figs. 6 and 7 show the adaptation of my invention to the support of a bicycle.

I make my improved rest or portable stand preferably out of spring-wire or rods of suitable strength, which I bend into a V shape, as shown at $a$, Fig. 4, but slightly rounded at the angle $a^\times$, the upper or open end being about two inches apart, and I bend inward the upper end of each wing of the said V-shaped rest at about right angles thereto, as shown at $b$.

The parts $b$ I will hereinafter call "journals." I then make a spring-clip, Figs. 1, 2, and 3, from a piece of sheet-steel $d$, bent as shown at Fig. 1 and provided with a nut and bolt $d^\times$, by means of which it may be attached to the tubing of that part $e$ of the frame of the bicycle known as the "bottom backstay." (See Figs. 6 and 7.) To this spring-clip I rivet or otherwise secure a bar $f$, made with two parallel jaws of the form shown, each of which is provided with a spirally-inclined bracket or cam $f^\times$, and these jaws are each pierced with a hole at $g$ to receive the two journals $b$ of the V-shaped rest, and when these are in position they are held in place by drawing or pressing upward the link or clip $c$, which embraces the two limbs of the V-shaped wire $a$, thus causing their upper ends to spring together and press against the surfaces of the two spiral brackets or cams $f^\times$.

It will be evident that when the rest is fixed by the clip to the bottom backstay of the machine it can be turned down into the position shown on Figs. 6 and 7, and when in that position it will act as a prop or leg and support the cycle in an almost vertical position, (see Fig. 7,) and that when not in use it can be turned up out of the way of the rider, resting against the backstay $i$ of the machine, as shown by the dotted lines on Fig. 6, and the form of the spiral cams $f^\times$ is such as will allow the journals $b$ to spring inward, so as to hold the rest $a$ firmly either in the upward or downward position, and the link or clip $c$ will at all times prevent the two limbs of the rest $a$ from being separated sufficiently far from each other to withdraw the journals $b$ altogether from the holes $g$ in the parallel jaws of the bar $f$, although they can move outward and inward sufficiently far to allow the upper ends of the wires $a$ to expand and contract as they ride over the spiral cams $f^\times$.

It will be evident that, if preferred, this improved rest may be made in the double form—that is, with one prop or support on each side of the machine—in which case the length of each prop $a$ will be such as to support the machine in a vertical position instead of slightly leaning over, as shown at Fig. 7; but in practice I find that the single support is sufficient.

I claim as my invention—

An improved detachable rest or support for bicycles consisting in the combination with a prop formed of steel or other spring-wire bent or doubled into a V form and with the ends bent inward at or near a right angle so as to form "journals," of a bar made with two parallel jaws having holes which act as bearings for such "journals," an open central space between said jaws, and the back of each jaw being made in a spiral form so as to act as cams against which the spring sides of the said wire prop act in the manner before mentioned; and with means for attaching the said bar to the frame of the bicycle, as hereinbefore described.

In testimony whereof I have signed my name to this specification in the presence of two subscribing witnesses.

JAMES LEACH.

Witnesses:
 JNO. HUGHES,
 J. ERNEST HUGHES.